No. 812,969. PATENTED FEB. 20, 1906.
W. C. WINFIELD.
ELECTRIC WELDING MACHINE.
APPLICATION FILED JAN. 9, 1905.

2 SHEETS—SHEET 1.

ATTEST.
INVENTOR.
William C. Winfield
BY H. J. Fisher ATTY.

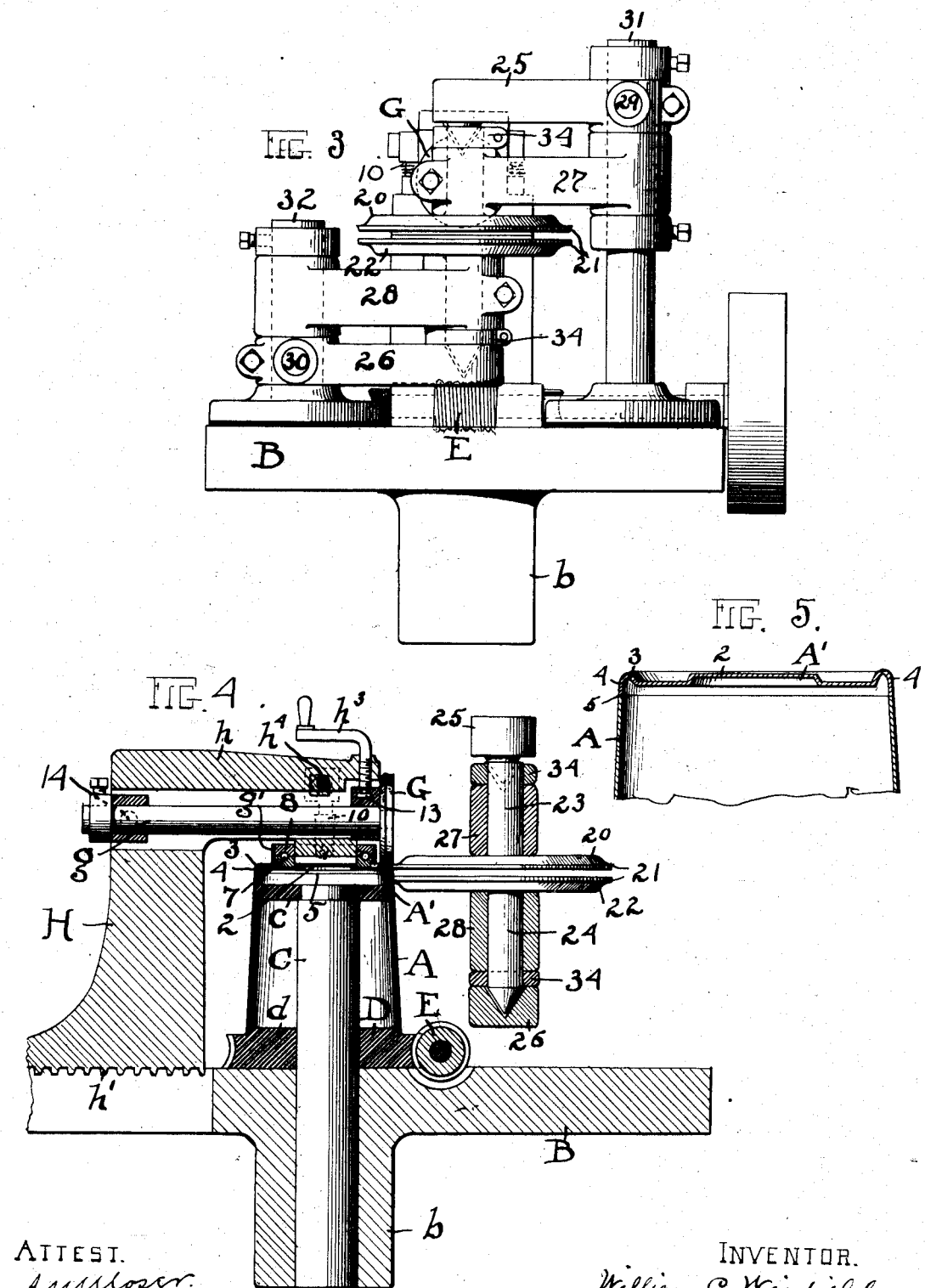

UNITED STATES PATENT OFFICE.

WILLIAM C. WINFIELD, OF WARREN, OHIO, ASSIGNOR TO THE WINFIELD MANUFACTURING COMPANY, OF WARREN, OHIO, A CORPORATION.

ELECTRIC WELDING-MACHINE.

No. 812,969.   Specification of Letters Patent.   Patented Feb. 20, 1906.

Application filed January 9, 1905. Serial No. 240,216.

*To all whom it may concern:*

Be it known that I, WILLIAM C. WINFIELD, a citizen of the United States, residing at Warren, in the county of Trumbull and State of Ohio, have invented certain new and useful Improvements in Electric Welding-Machines; and I do declare that the following is a full, clear, and exact description of the invention, which will enable others skilled in the art to which it appertains to make and use the same.

My invention relates to improvements in electric welding-machines; and the object of the invention is to provide a machine for electrically welding together upper and lower sections or parts of metallic kegs, buckets, cans, and other containing vessels or vessels having bottoms, all substantially as shown and described, and particularly pointed out in the claims.

Figure 1:
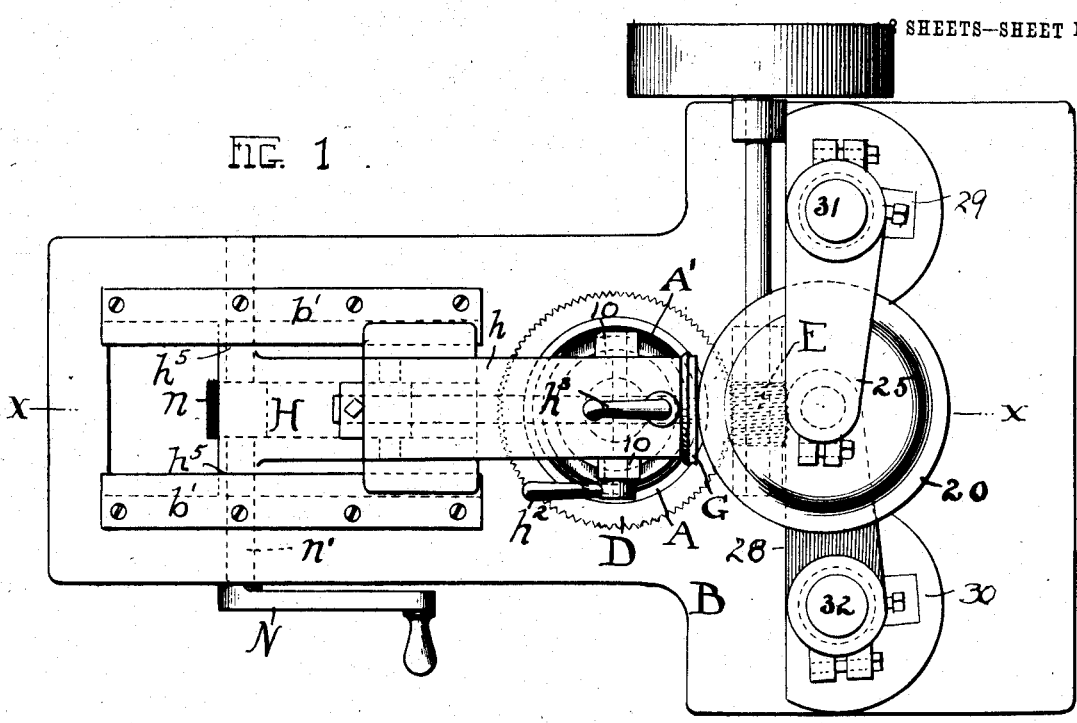
Figure 2:
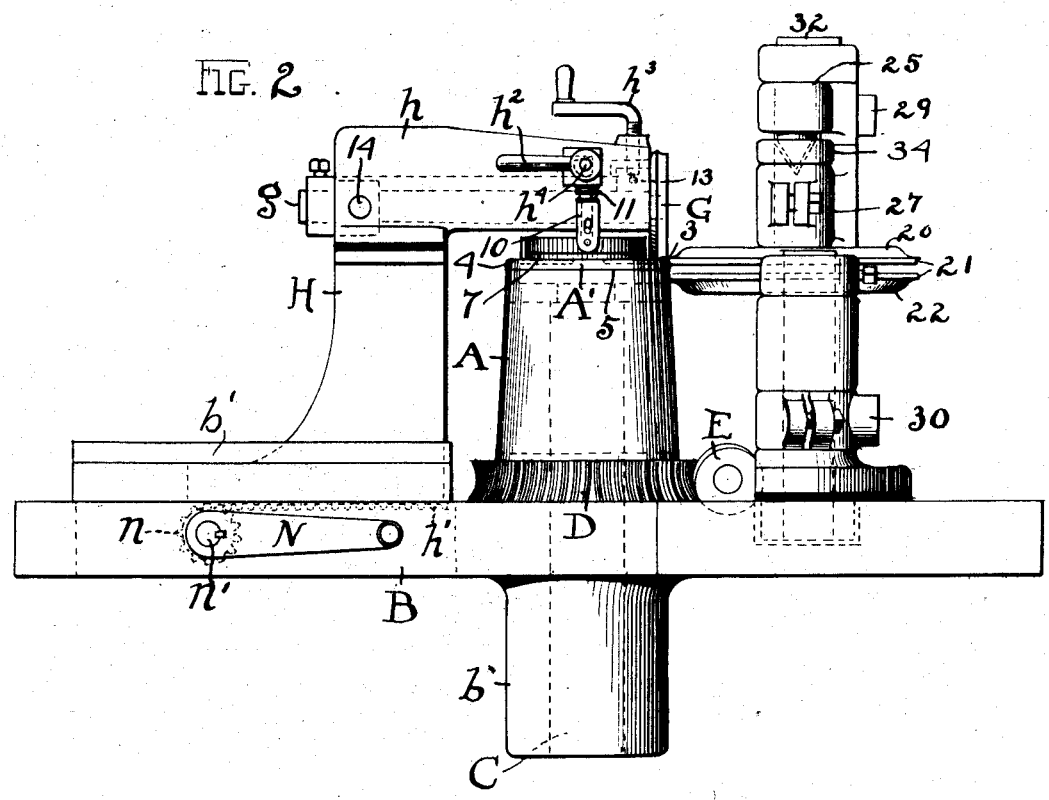

In the accompanying drawings, Figure 1 is a plan view of the machine, and Fig. 2 is a side elevation thereof. Fig. 3 is a side elevation at right angles to Fig. 2, and Fig. 4 is a vertical sectional elevation of the machine on a line corresponding substantially to $x\ x$, Fig. 1. Fig. 5 is a sectional elevation, enlarged, of the lower portion of the body and the bottom section of a vessel fashioned as in my invention preparatory to being welded into a unitary structure.

The construction of the machine is clearly disclosed in the several views and comprises a suitable base B, on which all the other parts are directly or indirectly supported, and the said base may have any necessary foundation or support of its own to give it firmness and support it in convenient working elevation.

The vessel to be welded, whatever its name or use, consists, primarily, of two parts or sections A and A', the section A representing the body of the vessel and the section A' representing the bottom portion thereof. Both these parts or sections are made complete in themselves, as shown, before coming to the machine to be united, and in order that they may be handled automatically or by the machine alone during the process of welding certain features peculiar to one or both of said parts, as well as means peculiarly adapted to do the work, are required, as will now be seen. Thus the bottom part or section A' of the vessel is formed with an annular depression 2 in its center, having a substantially right-angled edge and a bead, rim, or rib 3 thrown down about its outer edge on a plane with the bottom of said depression 2 and a side portion 4, which may be as high or higher than shown and is of exactly the same size and shape circumferentially as the matching edge or portion 5 of the body of the vessel, thus bringing said edges together to form a smooth joint when welding has been effected. Now having the two sections of a vessel fashioned in this way I provide supporting and centering means for the body-section A, consisting of a centering-disk $c$, which is projected snugly into the narrow top portion of the body-section A and has a friction-grip on the surface thereof. Said disk is on a vertical shaft C, which has its bearing in a hub $b$ in base B and carries a fixed gear-wheel D directly over and upon said base. The said gear-wheel has a raised center portion $d$ about shaft C, over which the vessel-body A is snugly seated and centered at its larger and lower end in this instance. Power is applied to said gear by worm E from any available source, and as disk $c$ fits closely in the upper reduced end of vessel A a rotary movement is imparted to said body by the rotation of said disk and through it to associated parts while the welding proceeds.

Having the body A of the vessel in position, the bottom section A' is placed edgewise on said body and is itself held in right relations thereto by several means, as will be seen. Thus there is first a ring 7 over the said bottom of a size to come within the outer bead or rim 3 and engage closely about the shouldered edge of depression 2, while a wheel G, conformed on its periphery to the rim or bead 3, bears down upon said bottom at its welding side or portion and has an inner flange, which further assists in holding the said bottom edge to edge with the body of the vessel. This roller or wheel G exerts a downward pressure on bottom A' directly over the welding-point. Thus the said wheel performs the two functions in part and especially keeps the two edges of the vessel in perfect contact while the welding proceeds.

Roller G is supported on one end of a horizontal shaft $g$, having bearings in the horizontal arm $h$ of standard H. The said arm is in this instance a separate part fixed upon and insulated from the standard proper; but except for the need of such insulation it might be integral therewith. The bottom of standard H has side flanges $h^5$, engaged in guideways $b'$ on frame B, in which the standard is slidable back and forth, and it is further provided with a rack $h'$ on its bottom adapted to be engaged by a pinion $n$ on a shaft $n'$, controlled by hand-lever N, whereby said standard and all the mechanism supported thereon is adapted to be moved bodily to and from the vessel, according as welding has been done or is to be done and as is obvious.

Two separate levers $h^2$ and $h^3$, supported on arm $h$, are operatively associated, respectively, with ring 7 and rim-roller G, and said ring 7 is suspended by suitable hangers $q'$ from an upper ring 8, which itself is suspended by hangers 10 and adapted to raise and lower said rings in respect to the vessel-bottom A'. The lever $h^2$ is fixed on cam-shaft $h^4$ and serves to raise and lower the rings 7 and 8, according as one position or the other is wanted, and antifriction-balls between said rings afford free rotation to the lower ring on its bearings. The hangers 10 for upper ring 8 are shown also as formed each in two parts slidably connected to adapt the said rings exactly to the work, and to accomplish this more effectively a spring 11 is placed between the two parts of hanger 10 to keep an even pressure on bottom A'. Lever $h^3$ is of double-crank form and has a threaded stem engaged through the extremity of arm $h$ and is engaged in or to the otherwise loose front bearing 13 for shaft $g$ in order to raise and lower the rim bearing-wheel G and fix said wheel in relation to the bottom of the vessel to exert the requisite pressure while welding is in progress.

At its opposite end shaft $g$ has a rocking bearing 14 in arm $h$. Obviously the rings 7 and 8 and the rim-wheel G are independently adjustable, though both are supported on or from the horizontal arm $h$ of the standard H; but they are carried, together with said arm, to and from working position when said standard is moved to and fro in its guideways. The same or equivalent effect could be obtained by rotarily supporting the standard upon base B. In either event when the arm $h$ is withdrawn access is given to place the sections of the vessel for welding or to remove the finished product.

Now, having provided the foregoing means for engaging and manipulating the vessel in the processes of the machine, the welding of the two sections thereof together is effected by means of two horizontally-disposed and separated conducting disks or rolls 20 and 22. Each roll is provided with its own spindle 23 and 24, respectively, having conical end bearings in this instance in arms 25 and 26 and supported, respectively, by arms 27 and 28, Fig. 3. These or any other suitable means may be employed to carry and hold the said rolls in right working relations, and opposite electric poles or connections 29 and 30 are provided in or through the arms which engage the spindles of said rolls, said arms being sleeved over standards 31 and 32, resting on base B. Collars 34 are clamped on the ends of the roll-spindles 23 and 24, and the said rolls are separated by an insulating-space, but otherwise are near enough to bear against the vessel-sections A and A' approximately at their meeting edges and relatively about as seen in Fig. 4—that is, the upper roll runs in contact with side portion 4 of the bottom section and roll 22 runs in contact with the corresponding portion 5 of the body-section of the vessel, while wheel G bears on the raised edge or rim 3 of the bottom directly over the points of contact by said rolls. It follows that when the electric current is turned on and passes from one roll to the other through the intervening portions of the vessel the said intervening portions will be heated to a welding temperature, and the work thus begun will be progressive as the vessel is rotated through the agency of disk $c$ until a complete circuit has been made. Meantime ring 7 rotates with the vessel and wheel G, and rolls 20 and 22 likewise are caused to turn by contact with the vessel. When once initial fusion is effected, it is easy to keep the two sections of the vessel in perfect relations so that they will become evenly blended where the union is made.

The standards 31 and 32 are properly insulated from base B, and other insulations may be used here and there, as required, to confine the electric current to its proper channels and with its circuit through rolls 20 and 22 and the intervening portions of the vessel.

The two rolls 20 and 22 have each a narrow peripheral edge flange 21, adapted to bear against the side of the vessel in the same vertical plane, and said flanges are on the inner sides of said rolls and contact with the vessel at each side of the welding-line and above and below the same, respectively, about as shown, so as to leave sufficient intervening metal in the electric circuit to make the welding effective and complete.

If other conductors or devices than the rollers 20 and 22 be found practical, they can be used; but there is advantage in a rolling conductor, because it keeps changing the point of contact and eliminates danger of burning out. In this instance the vessel-carrying mechanism is movable to and fro in respect to the conducting rolls or devices, which are fixed; but either may be movable, and the arm $h$ might be bodily raised and the standard H left stationary. All such minor changes are regarded as within the intent and scope of the invention and claims.

What I claim is—

1. An electric welding-machine adapted to weld together two circular members having matching edges, said machine comprising a pair of electric conductors arranged in an electric circuit with said members and adapted to bear against the same on opposite sides of the said matching edges and upon the outside thereof, rotatable devices to press the edges of said sections together, and means to impart rotation to said devices and thereby rotate said members.

2. An electric welding-machine adapted to unite two circular members of the same cross-section together, the same comprising a set of electric conductors arranged to make contact with the said members on opposite sides of their meeting edges, a rotatable support for one of said members, and rotatable means bearing on said other member and adapted to hold said members in edgewise relation between said conductors.

3. A machine adapted to electrically weld two sections of a containing vessel together, said machine having a pair of electric conducting devices, in combination with means to hold said vessel rotatably to a common center in contact with said devices.

4. In a machine for electrically welding together two parts of a vessel having a bottom, a pair of electric conducting devices, and means to hold the said parts of the vessel with their meeting edges midway between said conducting devices and in contact therewith, and means to rotate said vessel having direct operative engagement with one of said sections.

5. In electric welding, a pair of rotating conductors having alined axes, in combination with means to hold separate sections of a containing vessel edge to edge against said conductors and with the said edges between the conductors.

6. In electric welding, a pair of electric conductors, in combination with means to hold two sections of a vessel having a bottom in one section in contact with the said conductors, said means comprising an actuating member in one of said sections and a pressure device on the other.

7. In electric welding, a machine comprising a pair of conductors horizontally disposed with a space between them, in combination with a rotatable support for a vessel-body adapted to engage the vessel inside and means outside to hold the bottom section in welding relation to said body-section.

8. In electric welding, a machine adapted to weld together two sections of a vessel, said machine having a rotating member adapted to engage within one section of the vessel and another rotating member adapted to engage upon the other section of the vessel, and means to electrically weld said sections together.

9. A machine adapted to weld two sections of a vessel together comprising a rotatable device to engage one of said vessel-sections on its inside, and a device to engage the other section on its outside, said devices constructed to center said sections in respect to each other and means to electrically weld said sections together consisting of two conductors in contact with different sections of said vessel.

10. In electric welding, a pair of rotatable conductors, in combination with means to hold two sections of a containing vessel in welding relation thereto, said means comprising a rotatable centering device for one of said sections, a pressure device to bear upon the other section and a roller over the place of contact of said conductors adapted to bear upon the edge of the upper of said sections.

11. In electric welding, means to hold two sections of a vessel edge to edge to be welded, the same comprising a rotatable central guide and support for the lower section of the vessel and a rotatable device to bear upon and center the opposite section, a rolling pressure device to press upon the edge of the vessel and a pair of rotatable electric conductors engaging the side of the vessel above and below the welding-line.

12. In electric welding, means to support two sections of a vessel edgewise together to be welded, consisting of rotatable devices to carry one section of the vessel and pressure and centering devices for the other section of the vessel, and a movable support for said pressure and centering devices.

13. An electric welding-machine for containing vessels comprising a centering and base support for one of said sections, a movable arm over said parts and centering and pressure devices thereon to engage upon the other of said sections.

14. In electric welding-machines, a rotatable base and centering device for a section of a vessel to be welded, and a movable arm and pressure and centering mechanism thereon for another section of a vessel, said parts severally being constructed and arranged to bring said vessel-sections together edge to edge, and a pair of horizontally-arranged electric conductors contacting with different sections of said vessel.

In testimony whereof I sign this specification in the presence of two witnesses.

WILLIAM C. WINFIELD.

Witnesses:
M. J. SLOAN,
A. L. COLLINS.